(12) United States Patent
Chudgar et al.

(10) Patent No.: US 9,588,923 B2
(45) Date of Patent: Mar. 7, 2017

(54) FLOW PINNING IN A SERVER ON A CHIP

(71) Applicant: APPLIED MICRO CIRCUITS CORPORATION, Sunnyvale, CA (US)

(72) Inventors: Keyur Chudgar, San Jose, CA (US); Kumar Sankaran, San Jose, CA (US)

(73) Assignee: APPLIED MICRO CIRCUITS CORPORATION, Santa Clara, CA (US)

(*) Notice: Subject to any disclaimer, the term of this patent is extended or adjusted under 35 U.S.C. 154(b) by 421 days.

(21) Appl. No.: 14/162,903

(22) Filed: Jan. 24, 2014

(65) Prior Publication Data

US 2015/0324306 A1 Nov. 12, 2015

(51) Int. Cl.
*G06F 13/24* (2006.01)
*G06F 13/38* (2006.01)

(52) U.S. Cl.
CPC .................. *G06F 13/385* (2013.01)

(58) Field of Classification Search
None
See application file for complete search history.

(56) References Cited

U.S. PATENT DOCUMENTS

| | | | |
|---|---|---|---|
| 5,546,390 A | 8/1996 | Stone | |
| 6,553,002 B1 | 4/2003 | Bremer et al. | |
| 7,944,828 B2 * | 5/2011 | Ronciak | H04L 47/125 370/230 |
| 8,335,884 B2 * | 12/2012 | Hamadani | G06F 13/4022 710/316 |
| 8,762,362 B1 | 6/2014 | Sathe et al. | |
| 8,767,757 B1 | 7/2014 | Chudgar et al. | |
| 2003/0007489 A1 | 1/2003 | Krishnan et al. | |
| 2006/0265363 A1* | 11/2006 | Calvignac | G11C 15/00 |
| 2007/0011734 A1 | 1/2007 | Balakrishnan et al. | |
| 2010/0241831 A1 | 9/2010 | Mahadevan et al. | |
| 2012/0311300 A1* | 12/2012 | Sundrani | G06F 9/526 712/30 |

FOREIGN PATENT DOCUMENTS

WO 2012/129432 A2 9/2012

OTHER PUBLICATIONS

International Search Report & Written Opinion for PCT Application Serial No. PCT/US2015/041911, mailed May 30, 2016, 12 pages.

* cited by examiner

*Primary Examiner* — Henry Tsai
*Assistant Examiner* — Juanito Borromeo
(74) *Attorney, Agent, or Firm* — Amin, Turocy & Watson LLP

(57) ABSTRACT

Various embodiments provide for a system on a chip or a server on a chip that performs flow pinning, where packets or streams of packets are enqueued to specific queues, wherein each queue is associated with a respective core in a multiprocessor/multi-core system or server on a chip. With each stream of packets, or flow, assigned to a particular processor, the server on a chip can process and intake packets from multiple queues from multiple streams from the same single Ethernet interface in parallel. Each of the queues can issue interrupts to their assigned processors, allowing each of the processors to receive packets from their respective queues at the same time. Packet processing speed is therefore increased by receiving and processing packets in parallel for different streams.

20 Claims, 10 Drawing Sheets

FLOW PINNING IN A SERVER ON A CHIP

TECHNICAL FIELD

The subject disclosure relates to flow pinning in a server on a chip environment.

BACKGROUND

In computing networks, an Ethernet interface can receive packets from many different Ethernet connections or flows. In some systems, these flows of packets are processed serially, as they are received by a dedicated processor. In other traditional systems, these flows of packets are processed by peripheral network interface cards that enqueue the packets and/or flows to specific queues that are associated with a given CPU (central processing unit) in a multi-core processor. Network interface cards are expensive however, both in terms of cost, power, and latency, as well as taking up a lot of real estate in a system.

The above-described description is merely intended to provide a contextual overview of current techniques for performing flow pinning in a system on a chip and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a server on a chip comprises a first data structure, executed by a processor configured for extracting a metadata string from a packet. The server on a chip also includes a second data structure, executed by the processor, configured for associating the packet with a result database based on the metadata string. The server on a chip also includes an Ethernet direct memory access engine configured for assigning the packet to a queue based on the result database, wherein the queue is associated with a respective core of a multiprocessor.

In another example embodiment, a computer implemented method for flow pinning a packet stream to a core of a multiprocessor comprises extracting, by a processor executing a first data structure, a metadata string from a packet. The method also comprises associating, by the processor executing a second data structure, the packet with a respective result database based on the metadata string. The method also includes assigning, by an Ethernet direct memory access engine, the packet to a queue based on the result database, wherein the queue is associated with a respective core of the multiprocessor.

In another example embodiment, a server on a chip comprises a means for extracting a metadata string from a packet. The server on a chip also comprises a means for associating the packet with a respective core of a multiprocessor based on the metadata string. The server on a chip can further include a means for assigning the packet to a queue associated with the processor.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
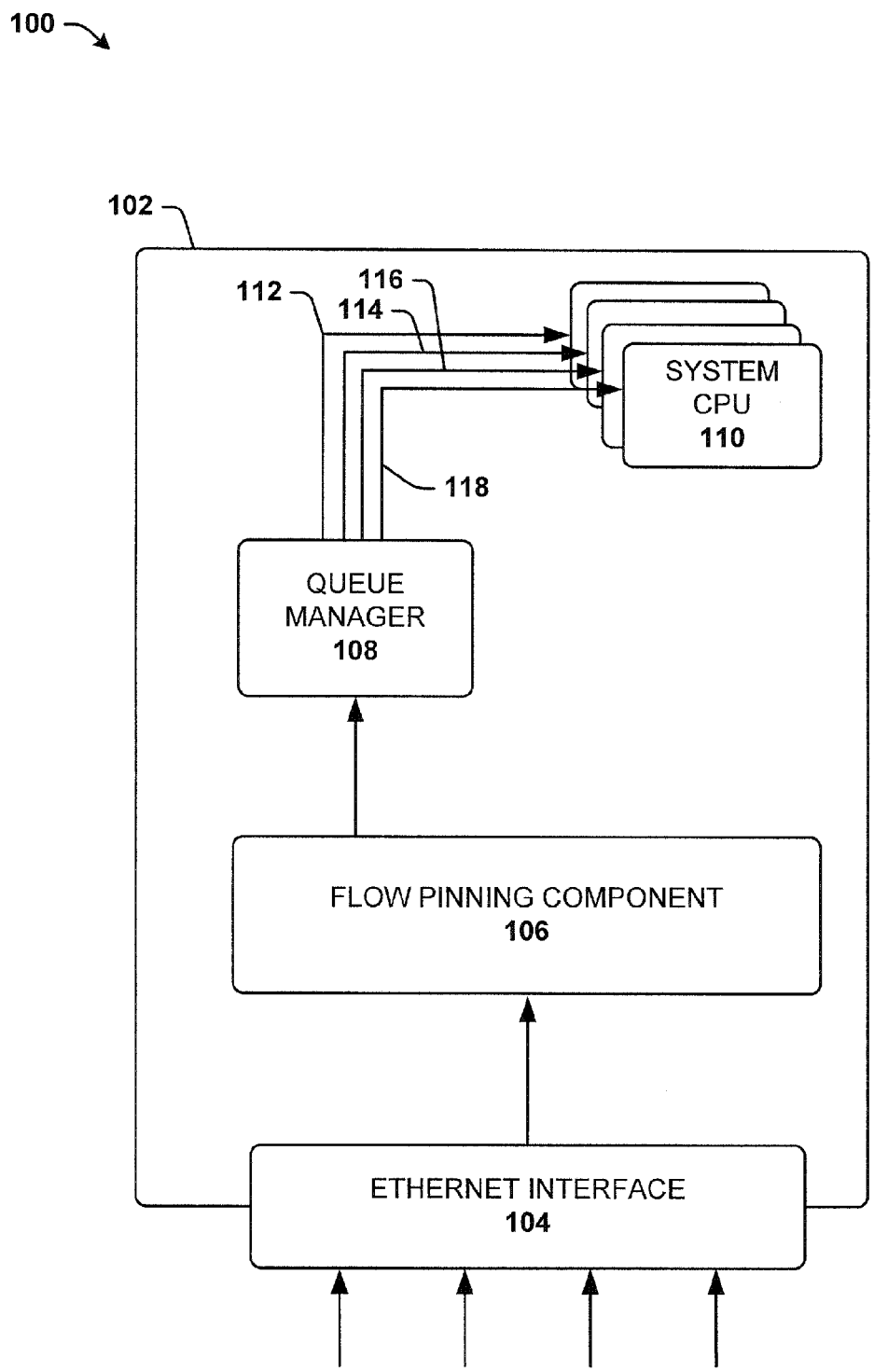
FIG. 1 is a block diagram illustrating an example, non-limiting embodiment of a system that performs flow pinning in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system on a chip or a server on a chip that performs flow pinning, where packets or streams of packets are enqueued to specific queues, wherein each queue is associated with a respective core in a multiprocessor/multi-core system or server on a chip. With each stream of packets, or flow, assigned to a particular processor, the server on a chip can process and intake packets from multiple queues from multiple streams from the same single Ethernet interface in parallel. Each of the queues can issue interrupts to their assigned processors, allowing each of the processors to receive packets from their respective queues at the same time. Packet processing speed is therefore increased by receiving and processing packets in parallel for different streams.

Performing flow pinning in this way, where each queue is associated with a respective core allows the throughput of incoming traffic with multiple streams to be increased. Cache and CPU utilization are also increased, as each core is used, and each core can access its own cache memory. This generally allows hardware costs to be reduced, while efficiently increasing the throughput of the system.

Turning now to the illustrations, FIG. 1 illustrates a system 100 that performs flow pinning in accordance with embodiments described herein. System 100 includes a system and/or server on a chip (SoC) 102 that includes an Ethernet interface 104. Ethernet interface 104 receives incoming packets over a network. The packets can form one or more streams or flows of data that are associated with one or more other computing devices on the network. In some embodiments, multiple flows of packets can be received from a single computing device, and in other embodiments, multiple flows of packets can be received from corresponding computing devices. The computing devices that the packets are received from can include, but are not limited to, routers, switches, directly from other SoCs, and the packets can be received via the local network, intranet, or Internet. In some embodiments, SoC 102 can include multiple Ethernet interfaces.

Ethernet interface 104 can pass the streams and/or flows of packets to a flow pinning component 106. Based on layer 3 and/or layer 4 header data and/or metadata information associated with the packets, the flow pinning component 106 can associate the flows of packets with one or more cores of the system CPU 110. Each flow can be assigned to a respective core of system CPU 110, or alternatively, each of the cores of system CPU can be assigned one of, or a set of, the packet streams received at the Ethernet interface 104.

Once the streams/flows of packets are assigned to respective cores of system CPU 110; the flow pinning component 106 can pass the packets, or packet header information to queue manager 118, which enqueues the packet and/or packet header information into queues 112, 114, 116, and 118 that are each associated with a respective one of the cores of system CPU 110. In an embodiment, the packets are stored in a memory (shown in more detail in FIG. 4 and FIG. 5) while descriptor messages associated with the packets are enqueued in queues 112, 114, 116, and 118. The descriptor messages, when the system CPU 110 receive their interrupts from the queue manager 108, provide information about the memory address of the packets that were stored in memory.

It is to be appreciated that while the embodiment shown in FIG. 1 depicts 4 cores in system CPU 110. In other embodiments, other numbers of cores are possible, and the number of queues can correspond to the number of cores.

Figure 2:
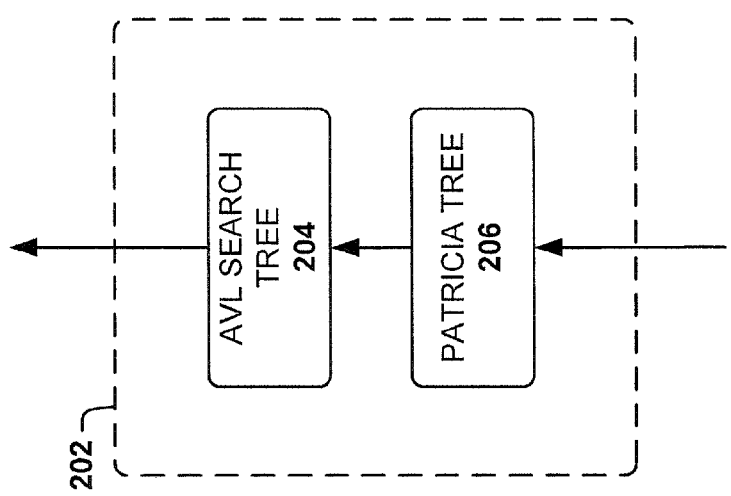
FIG. 2 is a block diagram illustrating an example, non-limiting embodiment of a system that performs flow pinning in accordance with various aspects described herein.

Turning now to FIG. 2, illustrated is a block diagram of an example, non-limiting embodiment of a system 200 that performs flow pinning in accordance with various aspects described herein. System 200 includes a flow pinning component 202 (e.g. flow pinning component 106) that can be configured for associating packets and/or packet streams with respective cores based on metadata associated with the packets.

Flow pinning component 202 can include a first data structure 206 that in an embodiment can be a patricia tree. Patricia tree 206 can be a space optimized tree data structure where each node with only one child is merged with its child. Patricia trees in general are useful for constructing associative arrays with keys that can be expressed as strings.

In an embodiment of the disclosure, patricia tree 206 can be configured for extracting a metadata string from a packet or packet header. The metadata string extracted by the patricia tree 206 can be a 4-tuple string that includes a source Internet protocol address, a destination Internet protocol address, a source port and a destination port. The patricia tree 206 can be preprogrammed with what packet data it needs to extract, and in other embodiments can extract a metadata string with other values. In an embodiment, the metadata string can be a 12 byte string of data, but other sizes of metadata strings are possible, where the size of the metadata strings can depend on the information that is extracted. In an embodiment, the AVL search tree 204 can be preprogrammed with all the supporting sessions, current and otherwise.

In an embodiment, the patricia tree 206 and the flow pinning component 202 receive the packet headers alone while the packets are held until the AVL search tree 204 determines which buffer pools to copy the packets to. In other embodiments, the flow pinning component 202 receives the packets, and on onboard Ethernet direct memory access engine copies the packets to the memory based on the results of the AVL search tree 204 determination.

Figure 3:
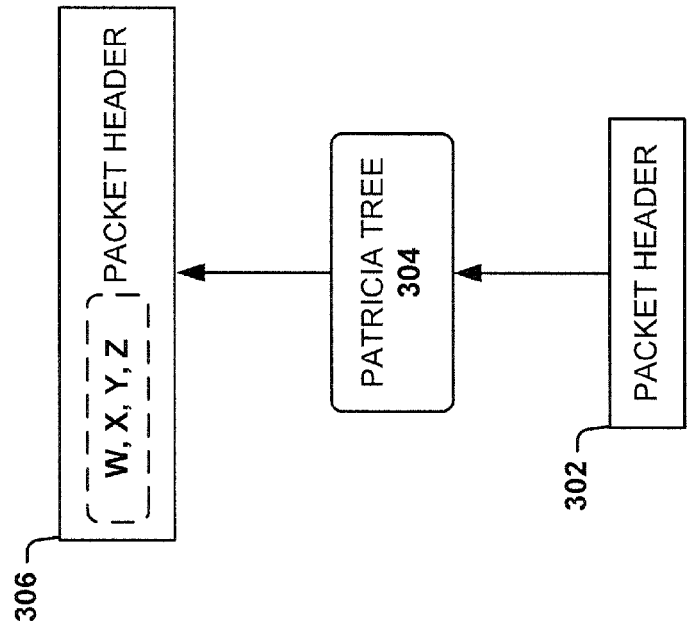
FIG. 3 is a block diagram illustrating an example, non-limiting embodiment of a system that performs metadata extraction from a packet header in accordance with various aspects described herein.

Turning now to FIG. 3, illustrated is an example, non-limiting embodiment of a system 300 that performs metadata extraction from a packet header in accordance with various aspects described herein. System 300 provides additional details for the metadata string extraction described in reference to FIG. 2. Patricia tree 304 receives a packet header 302. The packet header can contain information about where the packet originated from, where it is headed, and its mode of transportation. Patricia tree 304, based on a preprogrammed determination of the type of data to extract, can then extract, and form a metadata string of 4 values (shown as [W,X,Y,Z] in packet header 306). The values [W,X,Y,Z] can correspond to source IP address, destination IP address, source port, and destination port.

In other embodiments the values can correspond to other information about the packets. Additionally, in other embodiments, the metadata string can include fewer than 4 values, or greater than 4 values.

Figure 4:
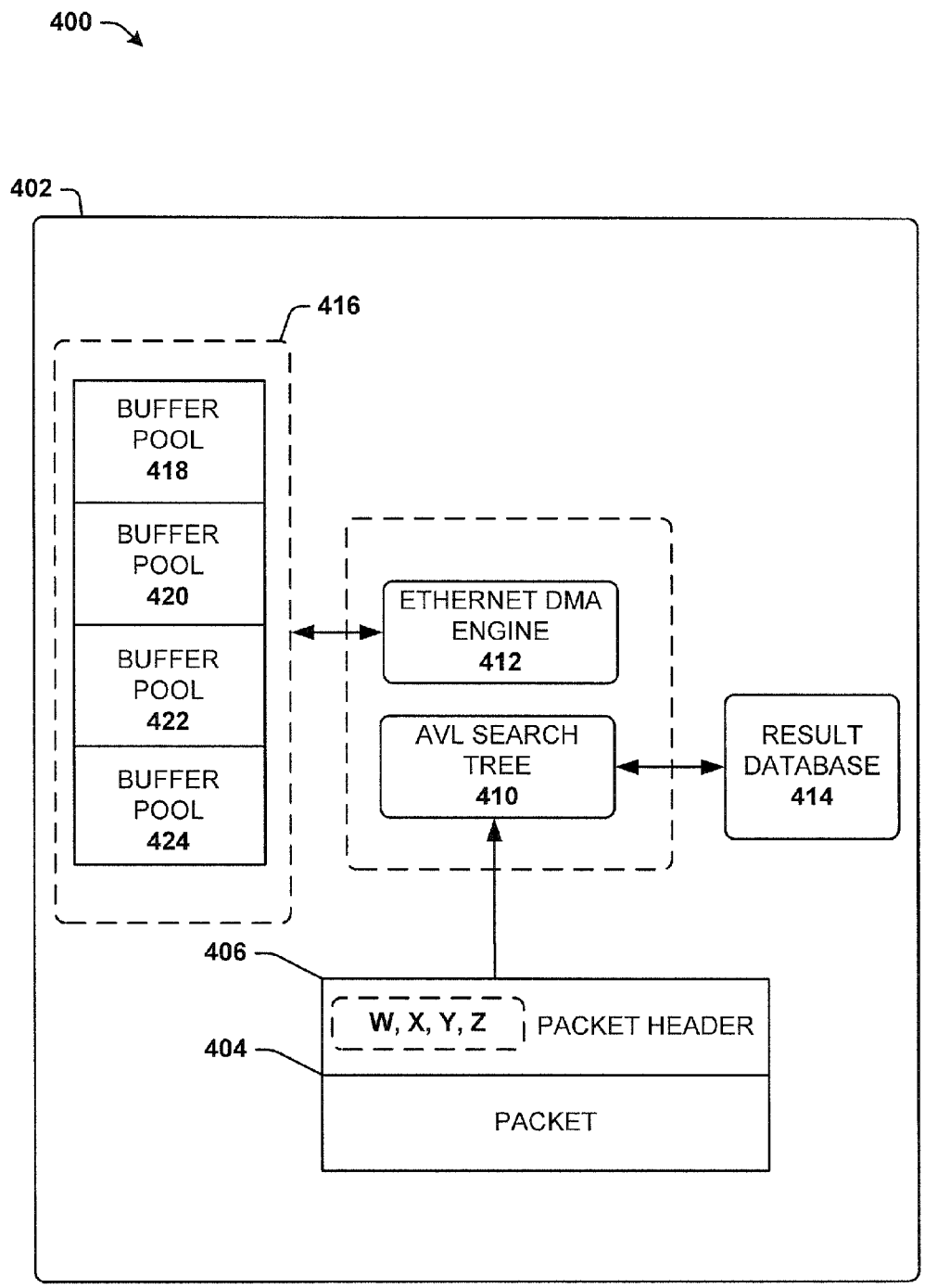
FIG. 4 is a block diagram illustrating an example, non-limiting embodiment of a system that performs packet enqueuing in accordance with various aspects described herein.

Turning now to FIG. 4, illustrated is an example, non-limiting embodiment of a system 400 that performs packet enqueuing in accordance with various aspects described herein. System 400 includes SoC 402 that receive a packet 404 via the SoC 402's Ethernet interface. Packet 404 includes a packet header 406 with a metadata string [W,X,Y,Z] that a patricia tree (e.g., patricia tree 206 and 304) has extracted. AVL search tree 410 uses the metadata string extracted by the patricia tree to determine the associated result database 414 for the packet header 406 and packet 404.

The associated result databases include the information such as which free buffer pool (418, 420, 422, and/or 422) in a memory 416 to copy the packet to, and which of the queues in which to enqueue the message to inform the CPU of a new packet. The AVL search tree 410 thus correlates the source and destination addresses and the source and destination ports with the result database 414 in order to determine which core of the CPU the packet 404 should be associated with and/or otherwise assigned to. In an embodiment, the AVL search tree 410 can be preprogrammed with all the supporting sessions, current and otherwise.

Once AVL search tree 410 determines which result database 414 the packet 404 and packet header 406 are associated with, Ethernet DMA engine 412 can be configured to assign and/or copy the packet 404 to the buffer pool 418, 410, 422, or 424 that the packet 404 is associated with. Each of the buffer pools 418, 410, 422, and 424 can be associated with one or more of the respective cores of the system CPU.

The Ethernet DMA engine 412 can also be configured to assign the packet to a queue based on the result database, wherein the queue is associated with a respective core of the CPU. Once assigned, the Ethernet DMA engine 412 enqueues a descriptor message to the assigned queue.

Figure 5:
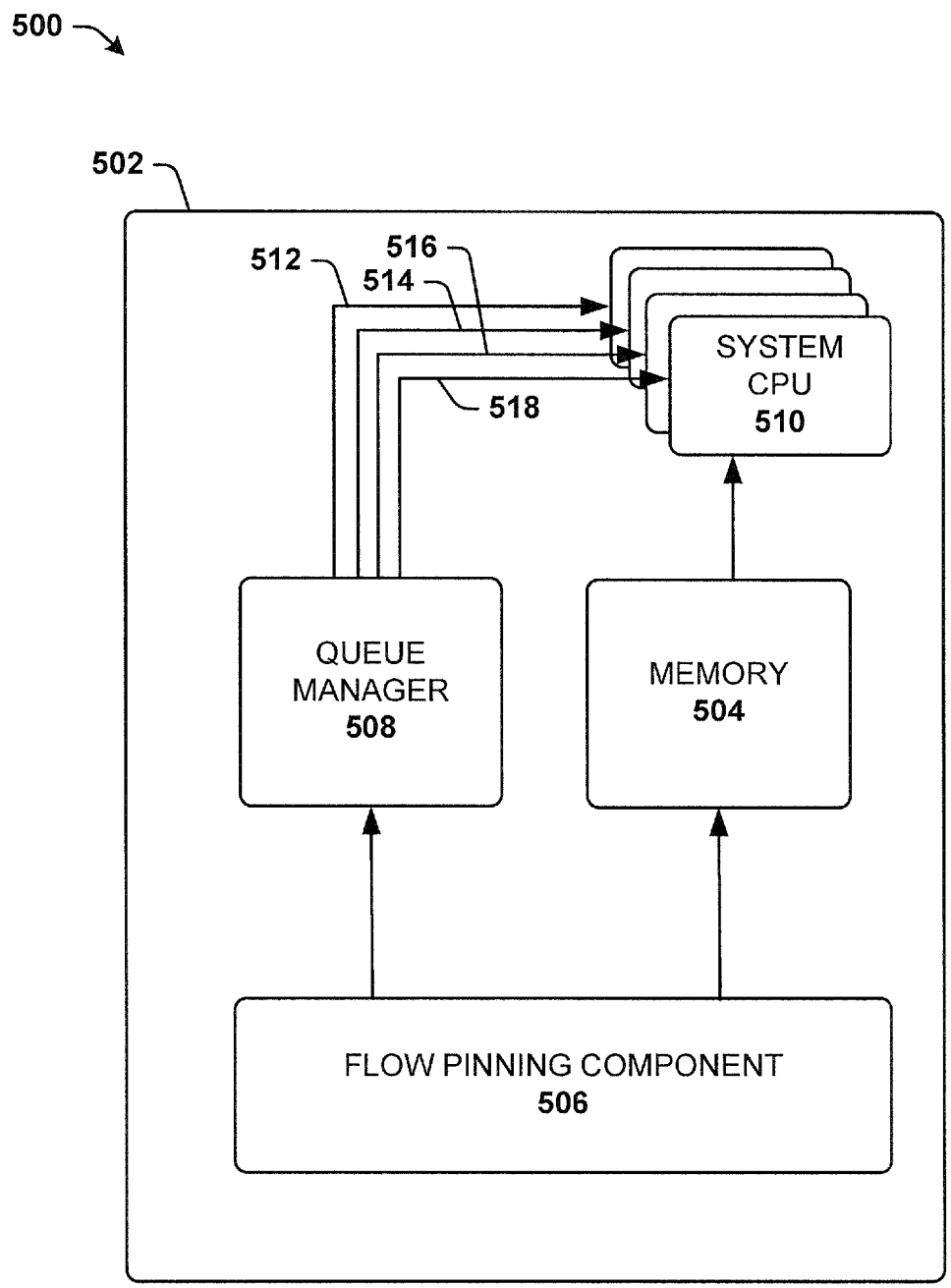
FIG. 5 is a block diagram illustrating an example, non-limiting embodiment of a system that performs flow pinning in accordance with various aspects described herein.

Turning now to FIG. 5, illustrated is an example, non-limiting embodiment of a system 500 that performs flow pinning in accordance with various aspects described herein. System 500 includes SoC 502 that receive a packet via the SoC 402's Ethernet interface. The packet can includes a packet header with a metadata string [W,X,Y,Z] that a flow pinning component 506 (e.g. patricia tree 206 or 304 and AVL search tree 204 or 410) can extract and be used to associate the packet with a result database and buffer pool in memory 504.

An Ethernet DMA engine on SoC 502 (not shown) can then copy the packet to the associated buffer pool in memory 504, while also sending a descriptor message to queue manager 508. The descriptor message can be enqueued in one of the queues 512, 514, 516, or 518 that correspond to the core of system CPU 510 that the packet has been assigned to. Each of the queues 512, 514, 516, and 518 can be configured to issue a unique interrupt to their respective core of system CPU 510. Once interrupted, the descriptor message provides details about the presence of the packet, and where it is located in memory 504.

It is to be appreciated that the SoC 502 and its components are capable of receiving multiple packets in parallel. As the different flows are simultaneously received, descriptor messages are enqueued in queues 512, 514, 516, and 518 in parallel, and thus each of the cores of system CPU 510 receive their associated packet streams in parallel. This avoids the need for using global locking to prevent multiple cores reading a single queue since there are multiple queues, each dedicated to each processor of system CPU 510.

FIGS. 6-9 illustrate processes in connection with the aforementioned systems. The process in FIG. 6-9 can be implemented for example by systems 100, 200, 300, 400, and 500 and illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
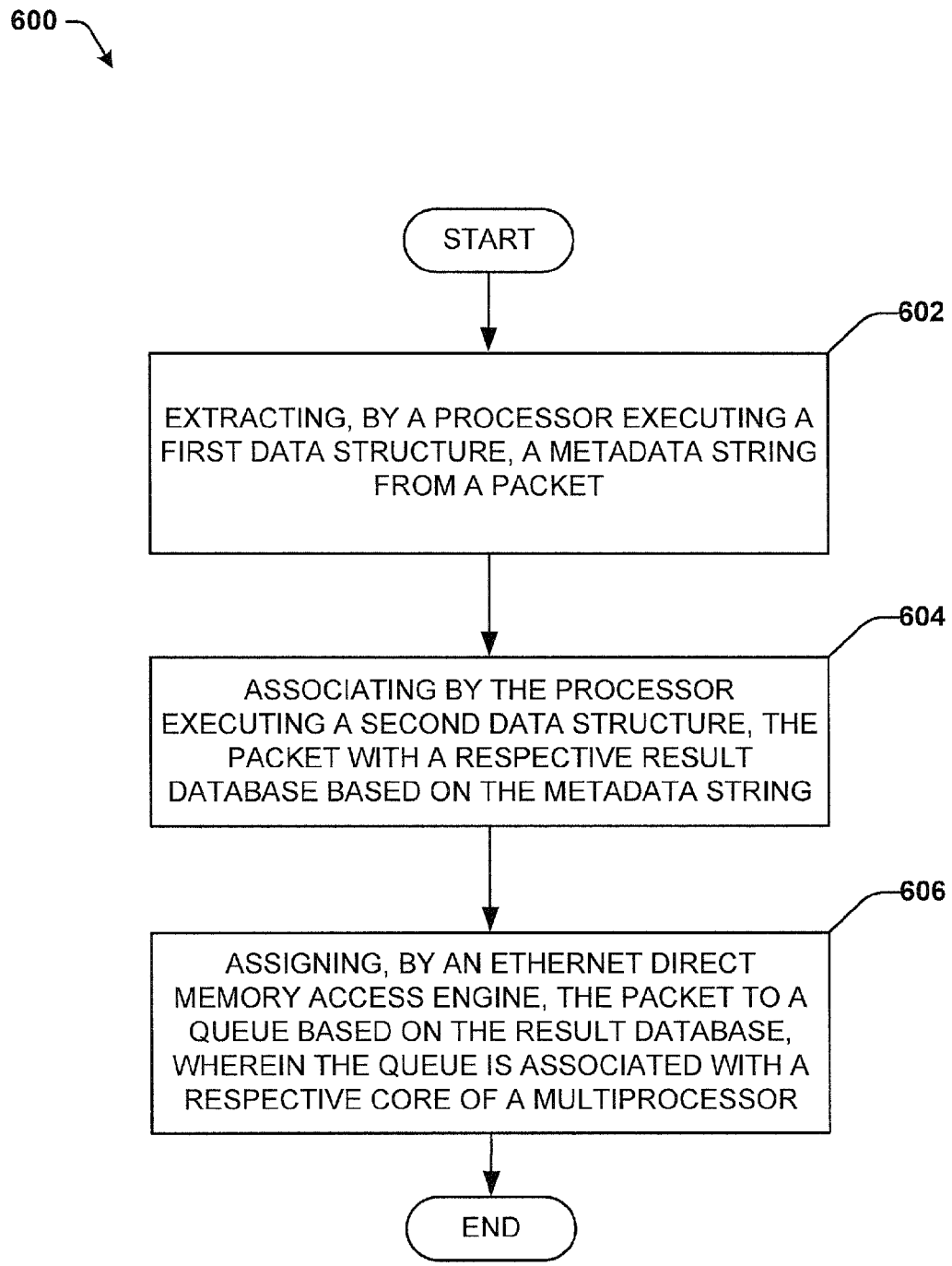
FIG. 6 illustrates a flow diagram of an example, non-limiting embodiment of a method for flow pinning.

FIG. 6 illustrates a flow diagram of an example, non-limiting embodiment of a computer implemented method for performing flow pinning of a packet stream to a core of a multiprocessor.

Method 600 can start at 602, where extraction of a metadata string from a packet can be performed by a first processor executing a first data structure. The first data structure can be a patricia tree (e.g., patricia tree 206 or 304). The patricia tree can be a space optimized trie data structure where each node with only one child is merged with its child. Patricia trees in general are useful for constructing associative arrays with keys that can expressed as strings. In an embodiment of the disclosure, the patricia tree can be configured for extracting a metadata string from a packet or packet header. The metadata string extracted by the patricia tree can be a 4-tuple string that includes a source internet protocol address, a destination internet protocol address, a source port and a destination port. The patricia tree can be preprogrammed with what packet data it needs to extract, and in other embodiments can extract a metadata string with other values.

At 604, the packet can be associated with a respective result database by the processor executing a second data structure, wherein the associating is based on the metadata string. The second data structure can be a AVL search tree (e.g., AVL search tree 204 or 410). The AVL search tree is a second data structure that then uses the metadata string extracted by the patricia tree to determine the associated result database for each packet/packet header. The associated result databases include the information such as which free buffer pool in a memory to copy the packet to, and which of the queues in which to enqueue the message to inform the CPUs of a new packet. The AVL search tree thus correlates the source and destination addresses and the source and destination ports with the result databases in order to determine which CPU the packet should be associated with and/or otherwise assigned to. In an embodiment, the AVL search tree associates the packet with the associated result database based on indexing a lookup table with the metadata string.

At 606, the packet can be assigned, by an Ethernet DMA engine (e.g., Ethernet DMA engine 412) to a queue based on the result database, wherein the queue is associated with a respective core of a multiprocessor. The Ethernet DMA engine can copy the packet to a free buffer pool determined by the result database, and also enqueue in the queues a descriptor message for the CPUs. The descriptor message provides details about the presence of the packet, and where it is located in the memory.

Figure 7:
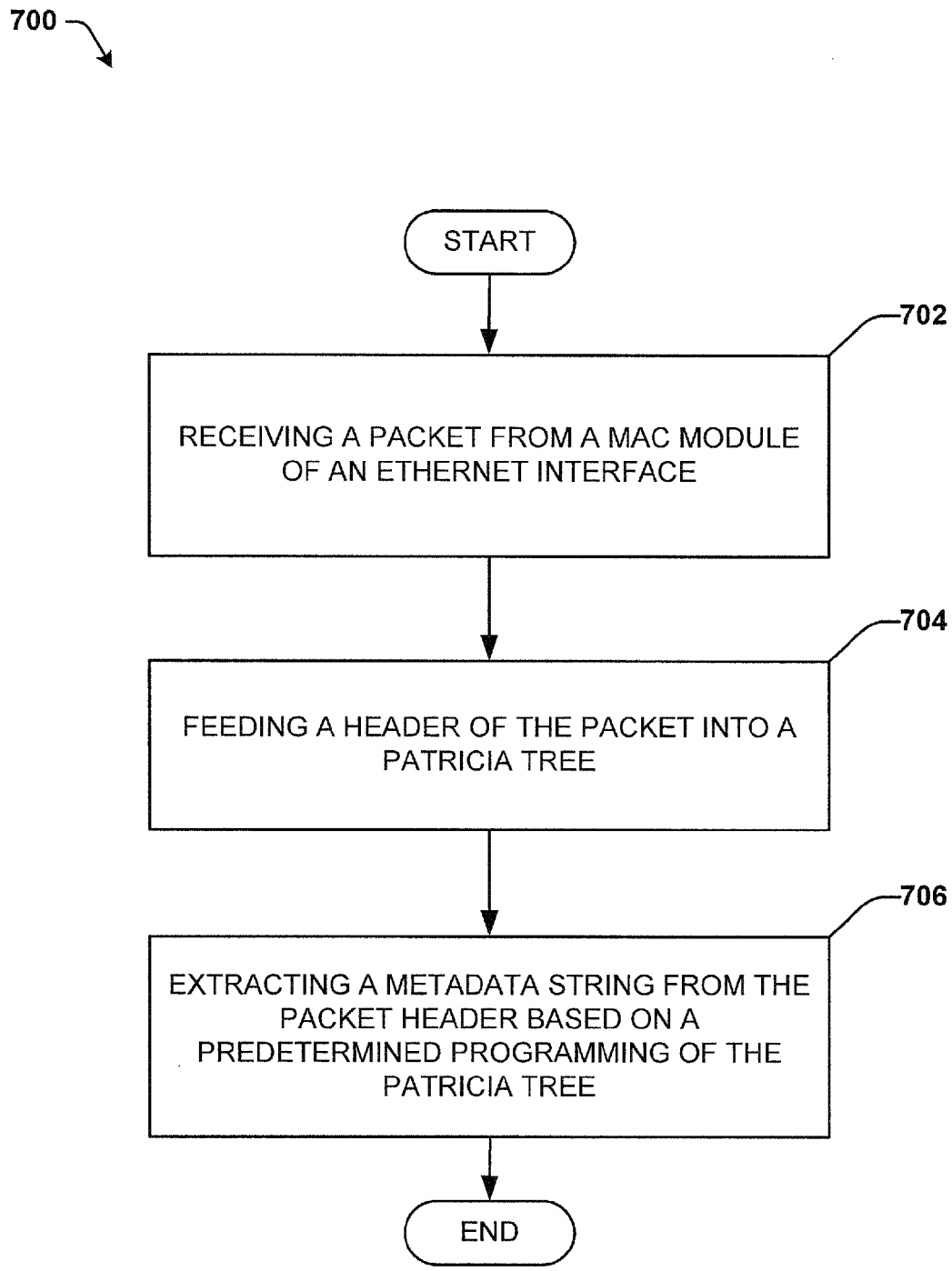
FIG. 7 illustrates a flow diagram of an example, non-limiting embodiment of a means for extracting a metadata string from a packet data.

Turning now to FIG. 7, illustrated is a flow diagram of an example, non-limiting embodiment of a means for extracting a metadata string from a packet data. At 702, a packet is received from a MAC module of an Ethernet interface (e.g., Ethernet interface 104). The Ethernet interface can have one or more Ethernet lines attached to it, and in an embodiment, can also be coupled to a wireless (e.g., WIFI 802.11a/b/g/n/ac) adapter. The Ethernet interface can receive incoming packets over a network. The packets can form one or more streams or flows of data that are associated with one or more other computing devices on the network. In some embodiments, multiple flows of packets can be received from a single computing device, and in other embodiments, multiple flows of packets can be received from corresponding computing devices. The computing devices that the packets are received from can include, but are not limited to, routers, switches, directly from other SoCs, and the packets can be received via the local network, intranet, or Internet.

At 704, a header of the packet can be fed into a patricia tree. At 706, a metadata string is extracted from the header of the packet based on a predetermine programming of the patricia tree. The metadata string extracted by the patricia tree can be a 4-tuple string that includes a source internet protocol address, a destination internet protocol address, a source port and a destination port.

Figure 8:
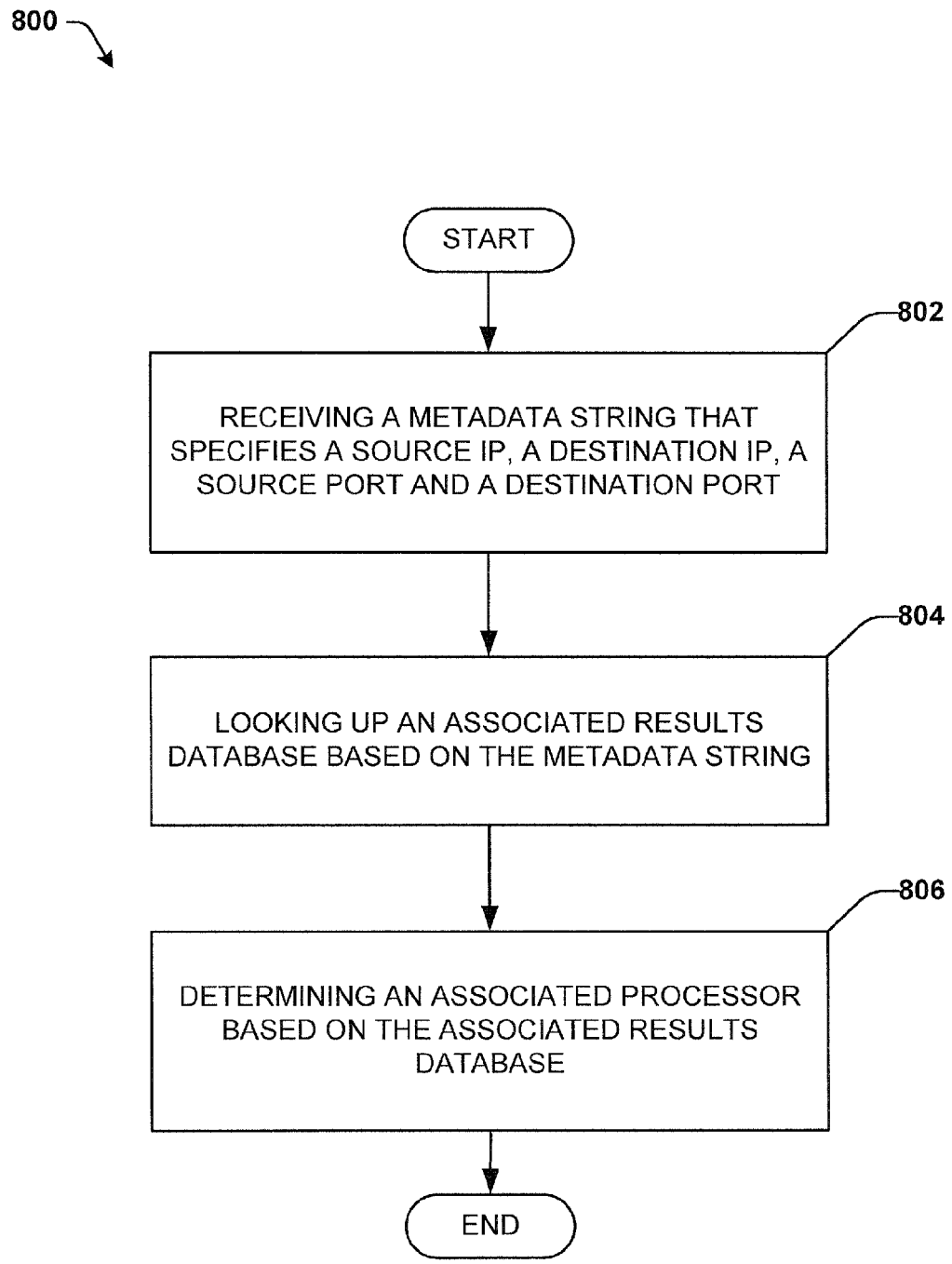
FIG. 8 illustrates a flow diagram of an example, non-limiting embodiment of a means for associating the packet with a respective processor based on the metadata string.

Turning now to FIG. 8, illustrated is a flow diagram of an example, non-limiting embodiment of a means for associating the packet with a respective processor based on the metadata string. At 802, a metadata string is received that specifies a source IP, a destination IP, a source port, and a destination port. This information can be used to determine where the packet originated from, the intended recipient, also something about the nature of the packet contents (based on the port).

At 804, an associated results database is looked up based on the metadata string. The lookup can be performed by an AVL search tree data structure. In an embodiment, the AVL search tree looks up one single entry per flow, and can be programmed with all the supporting sessions.

At 806, an associated processor can be determined based on the associated results table. The AVL search tree can associated the packet with the based on indexing a lookup table with the metadata string.

Figure 9:
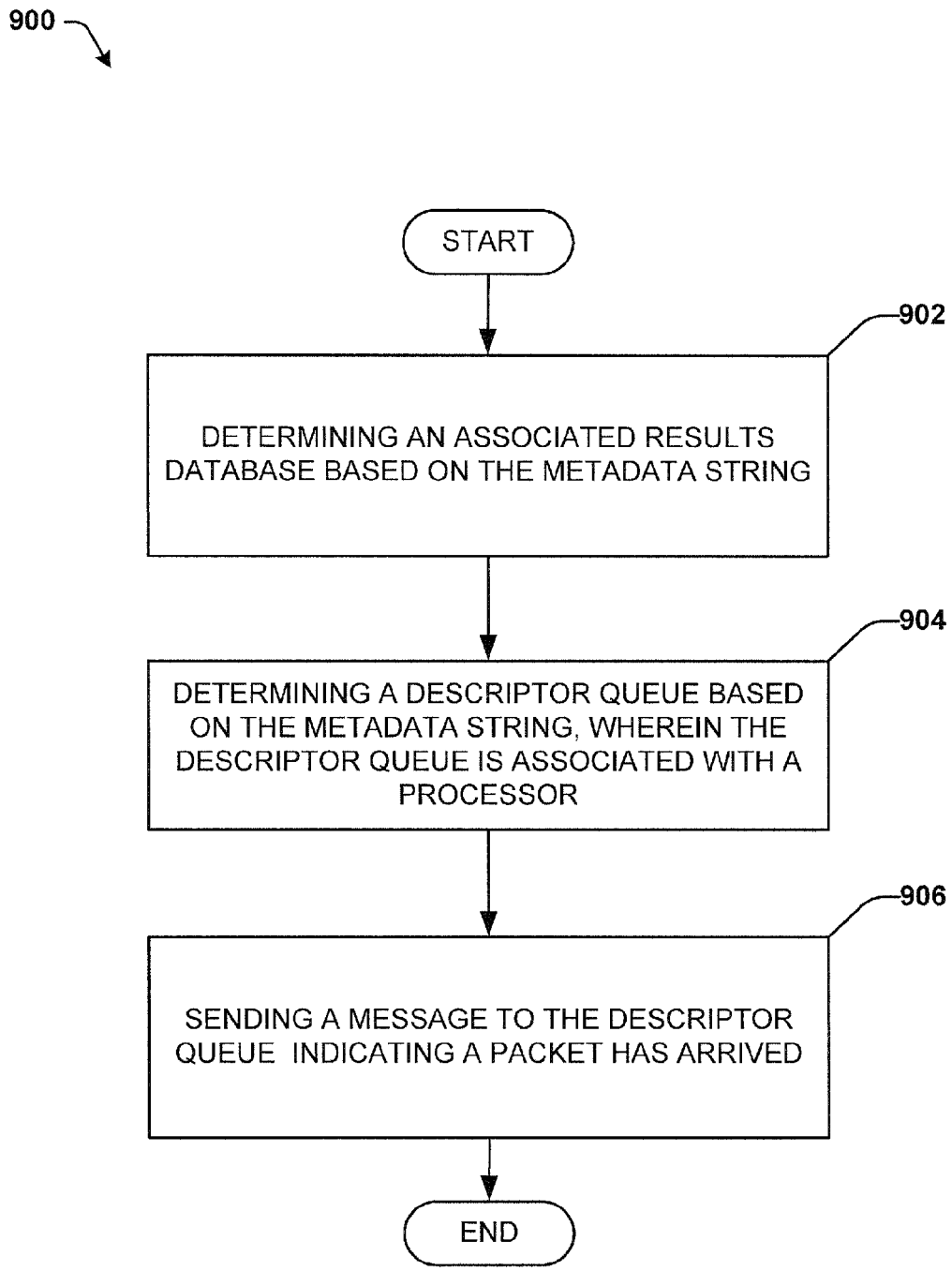
FIG. 9 illustrates a flow diagram of an example, non-limiting embodiment of a means for assigning the packet to a queue associated with the processor.

Turning now to FIG. 9, illustrated is a flow diagram of an example, non-limiting embodiment of a means for assigning the packet to a queue associated with the processor. At 902, an associated results data base is determined based on the metadata string. The AVL search tree can associated the packet with the based on indexing a lookup table with the metadata string.

At 904, a descriptor queue can be determined based on the metadata string, wherein the descriptor queue is associated with a processor. By correlating the metadata string with the associated results database, the processor that the packet belongs to, or should be assigned to can be determined. Since each queue is associated with a respective processor, the packet can be delivered to the appropriate descriptor queue.

At 906, a message is sent to the descriptor queue indicating that a packet has arrived. The message can be sent by an Ethernet DMA engine, and can indicate the location of the packet, and which buffer pool the packet has been stored in.

EXAMPLE COMPUTING ENVIRONMENT

As mentioned, advantageously, the techniques described herein can be applied to any device where it is desirable to facilitate the execution of flow pinning. It is to be understood, therefore, that handheld, portable and other computing devices and computing objects of all kinds are contemplated for use in connection with the various non-limiting embodiments. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

Figure 10:
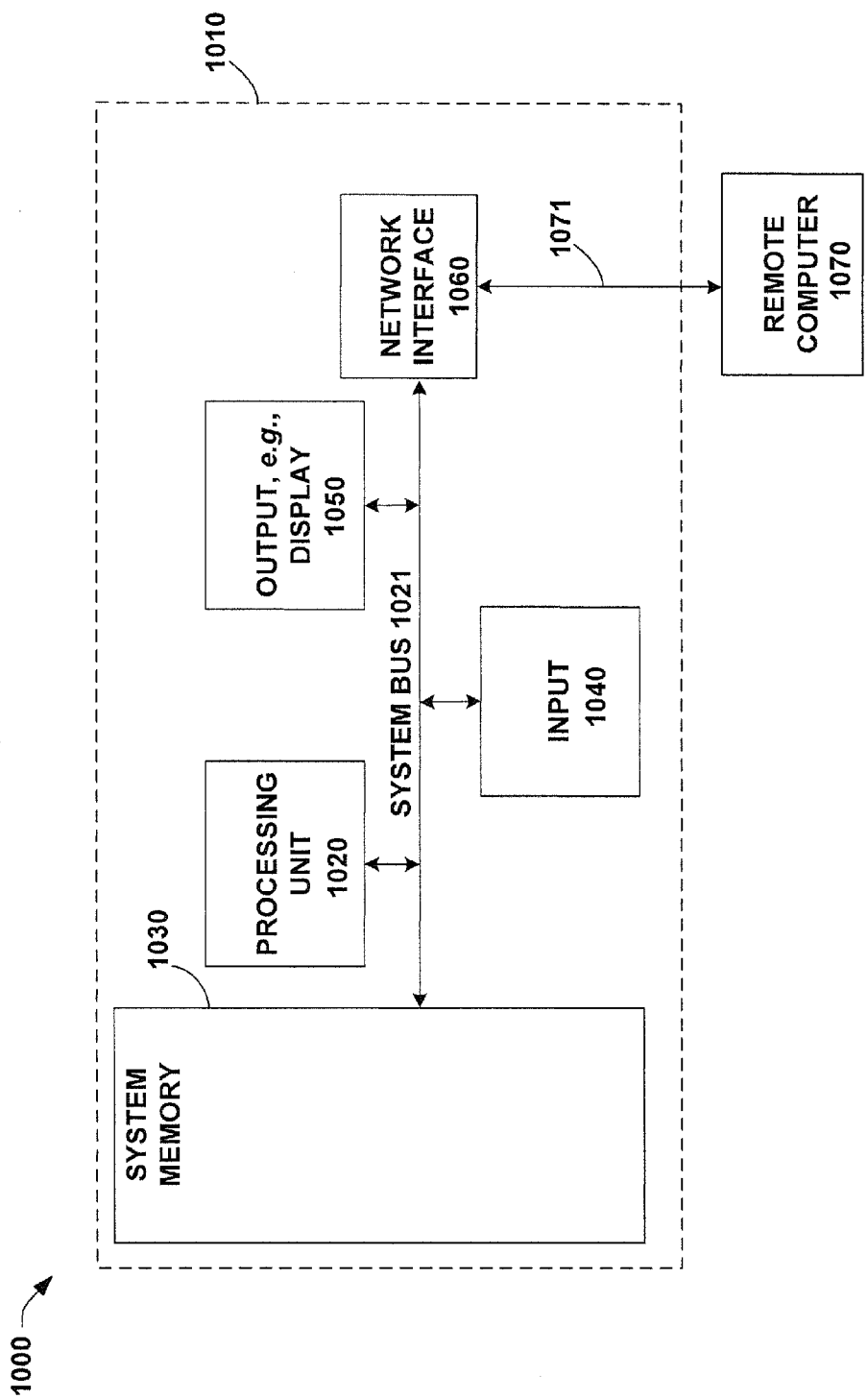
FIG. 10 illustrates a block diagram of an example electronic computing environment that can be implemented in conjunction with one or more aspects described herein.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from device 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

EXAMPLE NETWORKING ENVIRONMENT

Figure 11:
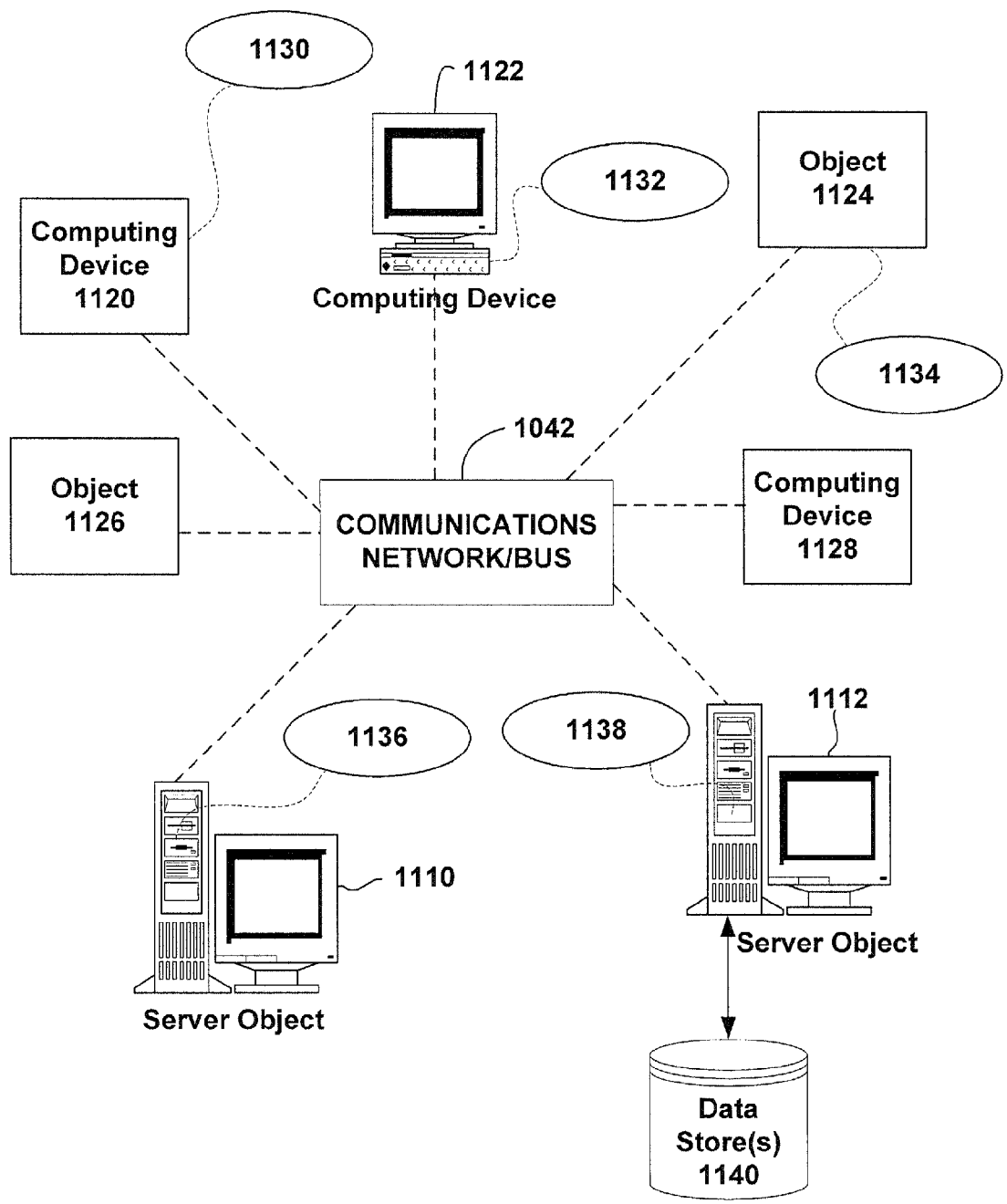
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including microprocessor 512, or similar devices depicted within the illustrations, or other devices such as a mobile phone, personal digital assistant (PDA), audio/video device, MP3 players, personal computer, laptop, etc. It should be further appreciated that data store(s) 1140 can include system memory 504, or other similar data stores disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A server on a chip, comprising:
a first data structure, executed by a processor, configured for extracting a metadata string from a packet;
a second data structure, executed by the processor, configured for associating the packet with a result database based on the metadata string; and
an Ethernet direct memory access engine configured for assigning the packet to a queue based on the result database, wherein the queue is associated with a respective core of a multiprocessor, the Ethernet direct memory access engine further configured for enqueuinq a descriptor message in the queue, and the descriptor message comprises data that indicates a presence of the packet and a location of the packet in a memory.

2. The server on a chip of claim 1, wherein the data structure is a patricia tree.

3. The server on a chip of claim 1, wherein the second data structure is an AVL search tree.

4. The server on a chip of claim 1, wherein the metadata string comprises a source internet protocol address, a destination internet protocol address, a source port, and a destination port.

5. The server on a chip of claim 1, wherein the metadata string is a 12 byte long string that contains 4 items of information.

6. The server on a chip of claim 1, wherein the metadata string is extracted from layer 3 and layer 4 header data of the packet.

7. The server on a chip of claim 1, wherein the second data structure associates the packet with the associated result database based on indexing a lookup table with the metadata string.

8. The server on a chip of claim 1, further comprising a queue manager configured for issuing respective unique interrupts to respective cores of the multiprocessor, wherein respective queues, comprising the queue, issue the respective unique interrupts to the respective cores, comprising the respective core.

9. The server on a chip of claim 1, wherein the first data structure extracts a plurality of metadata strings from a plurality of packets.

10. The server on a chip of claim 1, wherein the first data structure is preprogrammed to extract the metadata string based on the second data structure.

11. The server on a chip of claim 1, wherein the Ethernet direct memory access engine is further configured for copying the packet to a free buffer pool based on the result database.

12. The server on a chip of claim 11, wherein the Ethernet direct memory access engine is further configured for enqueuing, in parallel, respective descriptor messages, comprising the descriptor message, in respective queues, comprising the queue, wherein the descriptor message is based on the packet and the free buffer pool.

13. A computer implemented method for performing flow pinning of a packet stream to a core of a multiprocessor, comprising:
extracting, by a processor executing a first data structure, a metadata string from a packet of the packet stream;
associating, by the processor executing a second data structure, the packet with a respective result database based on the metadata string;
assigning, by an Ethernet direct memory access engine, the packet to a queue based on the result database, wherein the queue is associated with a respective core of a multiprocessor; and
enqueuing, by the Ethernet direct memory access engine, a descriptor message in the queue, the descriptor message comprising information that indicates a presence of the packet and a location of the packet in a memory.

14. The computer implemented method of claim 13, wherein the extracting further comprises extracting a 12 byte long string using a patricia tree, wherein the string comprises a source Internet protocol address, a destination internet protocol address, a source port, and a destination port.

15. The computer implemented method of claim 13, wherein the extracting further comprises extracting the metadata string from layer 3 and layer 4 header data of the packet.

16. The computer implemented method of claim 13, wherein the associating further comprises associating the packet with the associated result database based on indexing a lookup table with the metadata string.

17. The computer implemented method of claim 13, further comprising issuing an interrupt to the respective core via the assigned queue.

18. The computer implemented method of claim 13, wherein the extracting further comprises extracting a plurality of metadata strings from a plurality of packets.

19. The computer implemented method of claim 13, further comprising:
copying the packet to a free buffer pool based on the result database, wherein the descriptor message is based on the packet in the free buffer pool and a predetermined buffer.

20. A server on a chip, comprising:
means for extracting a metadata string from a packet;
means for associating the packet with a respective core of a multiprocessor based on the metadata string;
means for assigning the packet to a queue associated with the processor; and
means for enqueuing a descriptor message in the queue, the descriptor message comprising data that indicates a presence of the packet and a location of the packet in a memory.

* * * * *